(12) United States Patent
Cruickshank

(10) Patent No.: US 10,279,412 B2
(45) Date of Patent: May 7, 2019

(54) WELDING AND OTHER OPERATIONS DURING J-LAY PIPELAYING

(75) Inventor: John Duncan Cruickshank, Woodlands of Durris (GB)

(73) Assignee: Subsea 7 Limited, Sutton (GB)

( * ) Notice: Subject to any disclaimer, the term of this patent is extended or adjusted under 35 U.S.C. 154(b) by 1357 days.

(21) Appl. No.: 13/521,727

(22) PCT Filed: Jan. 10, 2011

(86) PCT No.: PCT/GB2011/050027
§ 371 (c)(1),
(2), (4) Date: Dec. 7, 2012

(87) PCT Pub. No.: WO2011/083339
PCT Pub. Date: Jul. 14, 2011

(65) Prior Publication Data
US 2013/0126500 A1    May 23, 2013

(30) Foreign Application Priority Data

Jan. 11, 2010 (GB) .................................... 1000359.8

(51) Int. Cl.
*B23K 9/00*  (2006.01)
*F16L 1/19*  (2006.01)
*F16L 1/235* (2006.01)
*B63B 35/03* (2006.01)
(Continued)

(52) U.S. Cl.
CPC ........ *B23K 9/0052* (2013.01); *B23K 37/0276* (2013.01); *B63B 35/03* (2013.01); *F16L 1/19* (2013.01); *F16L 1/207* (2013.01); *F16L 1/235* (2013.01)

(58) Field of Classification Search
CPC ............. B60C 11/0008; B60C 11/0041; B60C 11/032; B60C 2011/0025; B23K 37/0276; B23K 9/0052; B23K 2201/04; B23K 2201/10; F16L 1/19; F16L 1/207;
(Continued)

(56) References Cited

U.S. PATENT DOCUMENTS

| 4,591,294 A * | 5/1986 | Foulkes ............... B23K 9/0286 |
| | | 219/121.63 |
| 6,213,686 B1 | 4/2001 | Baugh |
| 6,273,643 B1 | 8/2001 | Baugh |

(Continued)

FOREIGN PATENT DOCUMENTS

GB        2460671 A    12/2009
WO   WO 2007/073146 A1    6/2007
(Continued)

*Primary Examiner* — Ibrahime A Abraham
*Assistant Examiner* — Diallo I Duniver
(74) *Attorney, Agent, or Firm* — Levy & Grandinetti

(57) ABSTRACT

A turntable assembly for performing welding or other operations in a pivotably-mounted J-lay tower is disclosed. The assembly includes an annular turntable supported by a base frame to turn about a pipe string in use and a tilt-compensating mechanism acting on the base frame to level the turntable as the tower pivots in use. The tilt-compensating mechanism includes at least one support that is driveable up and down with respect to the tower. In the embodiment disclosed, the support is a carriage movable along an upright track that pivots with the tower.

16 Claims, 8 Drawing Sheets

(51) Int. Cl.
 *F16L 1/20* (2006.01)
 *B23K 37/02* (2006.01)
(58) Field of Classification Search
 CPC ..... F16L 1/235; F16L 1/12; F16L 1/18; F16L 1/161; B63B 35/03
 USPC ........... 219/136; 405/166–173, 154.1, 195.1, 405/201, 202; 414/22.51; 228/212–213, 228/44.5, 49.3
 See application file for complete search history.

(56) References Cited

U.S. PATENT DOCUMENTS

| | | | |
|---|---|---|---|
| 6,334,739 B1* | 1/2002 | Baugh | F16L 1/19 405/166 |
| 2007/0023479 A1* | 2/2007 | Koppert | B23K 9/0286 228/101 |

FOREIGN PATENT DOCUMENTS

| | | |
|---|---|---|
| WO | WO 2008/099355 A1 | 8/2008 |
| WO | WO 2009/109950 | 9/2009 |
| WO | WO 2009/153352 A2 | 12/2009 |

\* cited by examiner

WELDING AND OTHER OPERATIONS DURING J-LAY PIPELAYING

This application claims priority to International PCT/GB2011/050027 filed on Jan. 10, 2011, which claims priority to Great Britain Application No. 1000359.8 filed on Jan. 11, 2010.

This invention relates to marine J-lay pipelaying using a floating vessel such as a barge to lay an offshore pipeline. The invention relates particularly to pipelaying systems and methods in which a J-lay tower is pivotable with respect to the hull of the vessel that carries it.

The J-lay technique is suitable for pipelaying in deep water. It involves welding together successive pipe sections or 'joints' in an upright (i.e. substantially vertical or near-vertical) orientation in a J-lay tower on a pipelaying vessel. The resulting pipe string is launched downwardly into the water as it is formed. The pipe string adopts a single bend as it nears the seabed to lend a J-shape to the pipe string extending between the vessel and the seabed—hence 'J-lay'.

To avoid buckling while keeping the pipe string under horizontal tension as it is being laid, the just-launched portion of the pipe string closest to the vessel should lie at a small angle to the vertical. The required exit angle may be achieved by bending the pipe from a vertical J-lay tower around a stinger, or the tower may be fixed at an angle to the vertical that approximates the ideal exit angle. Preferably, however, the J-lay tower is pivotable to tilt with respect to the hull of the vessel about at least one horizontal axis.

A pivotable J-lay tower is advantageous because the ideal exit angle of the pipeline can change with different water depths and pipeline characteristics, whereas stingers and fixed towers cannot readily accommodate such changes. Also, a fixed-angle J-lay tower requires the vessel to be steered along the pipeline route, even though a cross-wind or cross-current or the direction of incoming waves may make it preferable to steer across the pipeline route to turn the vessel 'into the weather'. This lack of steering freedom may lessen the stability and efficiency of the vessel and may even require pipelaying operations to be suspended if sea conditions deteriorate.

In some vessels, therefore, the J-lay tower is gimballed for two degrees of angular freedom—i.e. pivoting about two mutually orthogonal horizontal axes—so that the tower can be tilted in any direction with respect to the hull of the vessel. This gives more freedom to steer the vessel in a manner that suits the prevailing wind, current and waves—or indeed for other operational reasons—while maintaining a desired exit angle for the pipe string.

The J-lay tower, and thus the pipeline, is subjected to vessel motions—roll and pitch—induced by the sea state. Those motions place additional stress on the pipeline and may reduce its fatigue life. Fixed J-lay towers suffer from an inability to respond dynamically to the forces encountered during pipelaying operations. Gimballed J-lay towers have the potential to compensate dynamically for roll and pitch of the vessel so as to place less stress on the pipeline. This may widen the 'weather window' in which a pipeline can be laid and also may enhance the fatigue life of the laid pipeline.

An example of a gimbal-mounted J-lay tower is found on the Applicant's derrick lay barge Acergy Polaris. The vessel's J-Lay tower can be positioned quickly and held at a tilt angle of up to 15° from the vertical with an azimuth range of 180°. There is also the possibility of active gimballing to cancel out the vessel's motions, although in practice the vessel is stable enough that active gimballing need rarely be used.

The operation of Acergy Polaris during pipelaying will now be described with reference to FIGS. 1 to 3 of the drawings. It should be noted that this example is given simply to put the invention into context and so does not limit the scope of the invention. In those drawings.

Figure 1:
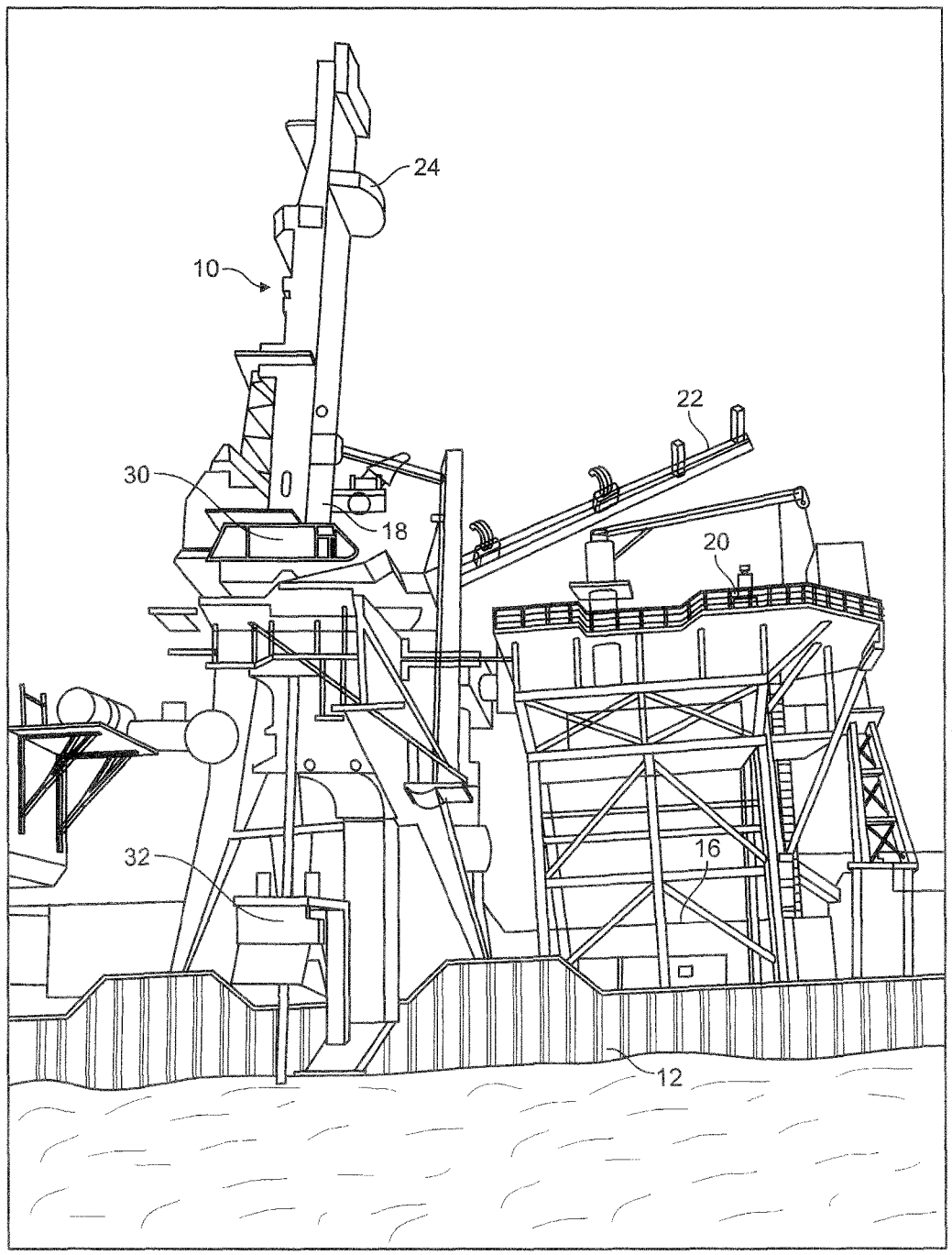
FIG. 1 is a side view of a J-Lay tower on a barge.

The gimballed J-lay tower 10 of the barge 12 is supplied with double joints 14 of pipe made onshore, which are stored horizontally on the deck 16. As required, the double joints 14 are lifted successively in horizontal orientation from the deck 16 to a tower entry level 18 using a pipe elevator system 20 best shown in FIG. 2. Here, a double joint 14 is loaded into a pivoting erector arm 22 which upends the double joint 14 into an upright orientation and passes it over to a tower handling system comprising a tensioner 24. The double joint 14 is then lowered down and aligned with the pipeline end 26 held in a support bushing 28 (see FIG. 3) at a first work station 30 on the tower 10.

The double joint 14 is welded to the pipeline end 26 at the first work station 30 before the load of the pipe string is transferred to the tensioner 24 near the top of the J-lay tower 10. The completed pipe string is then lowered down to the support bushing 28 for the addition of the next double joint 14. The tensioner 24 and the support bushing 28 alternate to grip the pipeline end, interacting in a so-called 'hand-over-hand' manner.

As the pipe string is lowered, a field joint coating is applied to the welded joint at a second work station 32 suspended from the tower 10 below the first work station 30. The weld can be inspected at either or both of these two work stations 30, 32.

Figure 3:
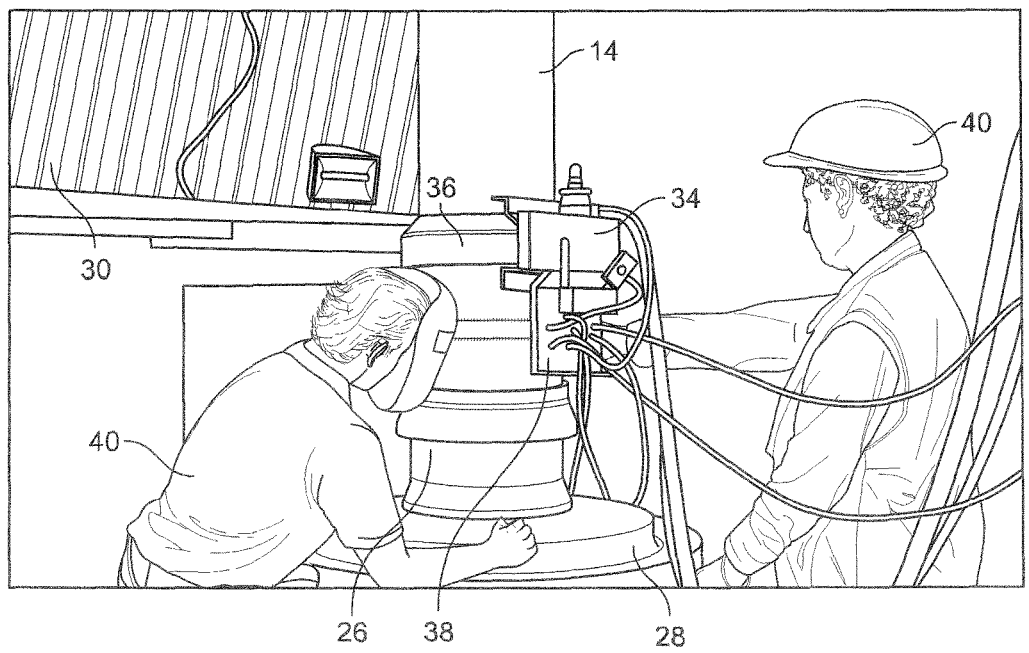
FIG. 3 is a perspective view of a welding operation taking place at a welding station in the tower of FIG. 1.

As shown in FIG. 3, welding is performed by one or more automatic welding machines or 'bugs' 34 that are driven around the pipe string on a track or guiding band 36 affixed to the double joint 14 being welded to the pipeline end 26 below. This welding arrangement involves the '2 G position', that term referring to a pipelaying technique in which a welding bug performs a weld by turning around a pipe held stationary in an upright orientation.

The or each bug 34 moves circumferentially around the pipe string so that one or more welding heads 38 carried by the bug 34 can run a weld bead within a groove defined between the double joint 14 and the pipeline end 26.

Each welding bug 34 requires services including power, data connections, shielding gas and welding wire to be fed continuously to the welding heads 38 during welding. Delivering these services is a challenge as the bugs 34 must turn around the pipe string while the pipe string tilts with the gimballed J-lay tower 10 with respect to the hull of the vessel 12.

Platforms at each work station 30, 32 enable pipeline workers 40 such as welders and supervisors to weld, inspect and coat the pipe string in the J-lay tower 10.

It is known for a platform at a J-Lay welding station to incorporate an annular turntable that turns around the pipe string in synchronisation with the welding bugs. The turntable provides a working platform for the pipeline workers who control and observe the welding operation and may also support equipment required for the welding operation and for related processes such as weld inspection.

The turntable must accommodate the two-axis movements of the J-lay tower with respect to the hull of the vessel. Another challenge in the context of a tilting J-lay tower is how to weld double-walled pipelines (not shown), also known as a 'pipe-in-pipe' arrangement. In this arrangement, an inner pipe serves as a flowline, while an outer pipe serves as a carrier pipe spaced from the inner pipe to define an annular space between the pipes. The annular space may be filled with an insulating material to reduce heat loss from fluid flowing in the flowline. The carrier pipe also gives some protection to the flowline and may contain any leakage of fluid from the flowline. The challenge here is that the flowline and the carrier pipe must be welded at different elevations.

Against this background, the invention resides in a turntable assembly for performing welding or other operations in a pivotably-mounted J-lay tower of a pipelaying vessel, the assembly comprising: an annular turntable supported by a base frame to turn about a pipe string in use; and a tilt-compensating mechanism for attachment to the tower, acting on the base frame to level the turntable as the tower pivots in use; wherein the tilt-compensating mechanism comprises at least one support that is driveable up and down with respect to the tower.

The support is preferably a carriage movable along an upright track that pivots with the tower. The or each support may be driven in response to manual control or to signals from a control system that controls pivoting movement of the tower.

The base frame of the turntable assembly is preferably supported with respect to the tower entirely by one or more of such supports. Advantageously the turntable assembly comprises at least two supports and the turntable is levelled, to at least some extent, by differential elevation of the supports.

In general, the base frame is pivotably connected to the or each support to compensate for pivoting movement of the J-lay tower. For gimballing, the base frame is preferably pivotable with respect to the or each support about two mutually-orthogonal, generally horizontal pivot axes.

In the embodiment to be described, the base frame pivots about one pivot axis in response to up-or-down movement of the or each support and about the other pivot axis in response to an actuator such as a hydraulic cylinder acting between the base frame and the support. That actuator may act in response to manual control or to signals from a control system that controls pivoting movement of the tower.

Elegantly, a member that is hinged with respect to the support about one pivot axis may carry a pivot defining the second pivot axis. That member is suitably supported by a suspension frame that is fixed to the support. The turntable assembly may further comprise a beam that is pivotably attached to that member at the pivot and that supports the base frame.

To compensate for variations in the horizontal distance between parallel tilting tracks along which the supports run, a floating joint is preferably disposed between the base frame and the or each support. That floating joint may comprise at least one lateral support element that is laterally extensible and retractable with respect to the base frame. For example, the lateral support element of the floating joint is suitably received telescopically in a tubular member of the base frame. The aforementioned beam may carry the lateral support element of the floating joint.

To enable height adjustment of the turntable, turntable elevation is preferably adjustable separately from tilt compensation by up-or-down movement of the or each support.

For effective routing of services such as power, the turntable preferably comprises a core about which cables or umbilicals are wound to provide services to welding apparatus acting on the pipe string.

The inventive concept extends to a vessel having a J-lay tower, or a J-lay tower for such a vessel, comprising the turntable assembly of the invention. The inventive concept further extends to a method of levelling a turntable when performing welding or other operations in a pivotably-mounted J-lay tower, the method comprising supporting the turntable by one or more supports and driving the or each support up or down with respect to the tower.

The inventive concept also enables, and extends to, a method of pipe-in-pipe welding involving the use of a turntable in a pivotably-mounted J-lay tower, the method comprising supporting the turntable by one or more supports and, when welding a joint to a pipeline end, driving the or each support up or down with respect to the tower to different weld elevations as required by the pipe-in-pipe arrangement.

Figure 2:
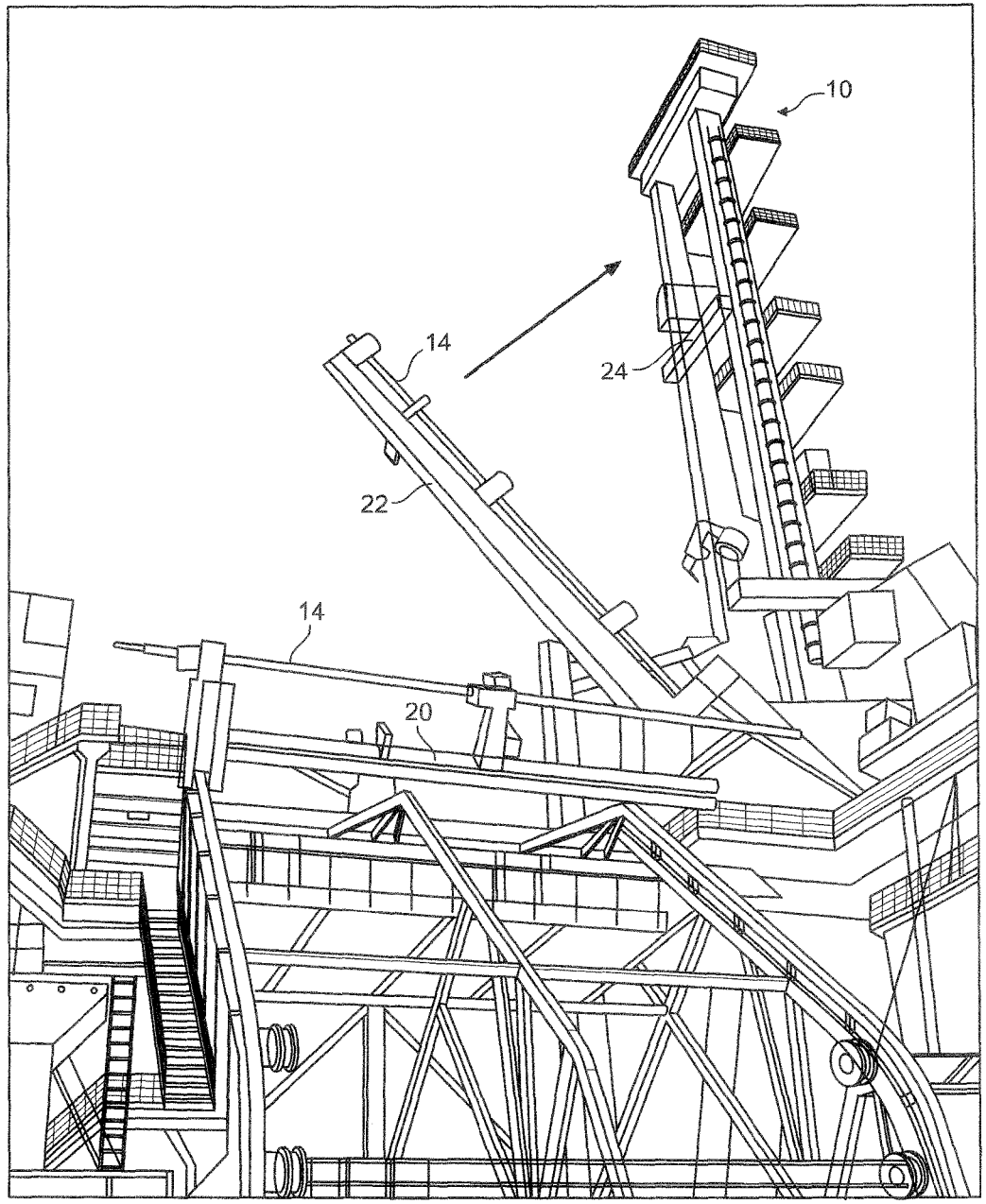
FIG. 2 is a perspective view of an erector arm loading a double joint into the tower of FIG. 1.
Figure 4:
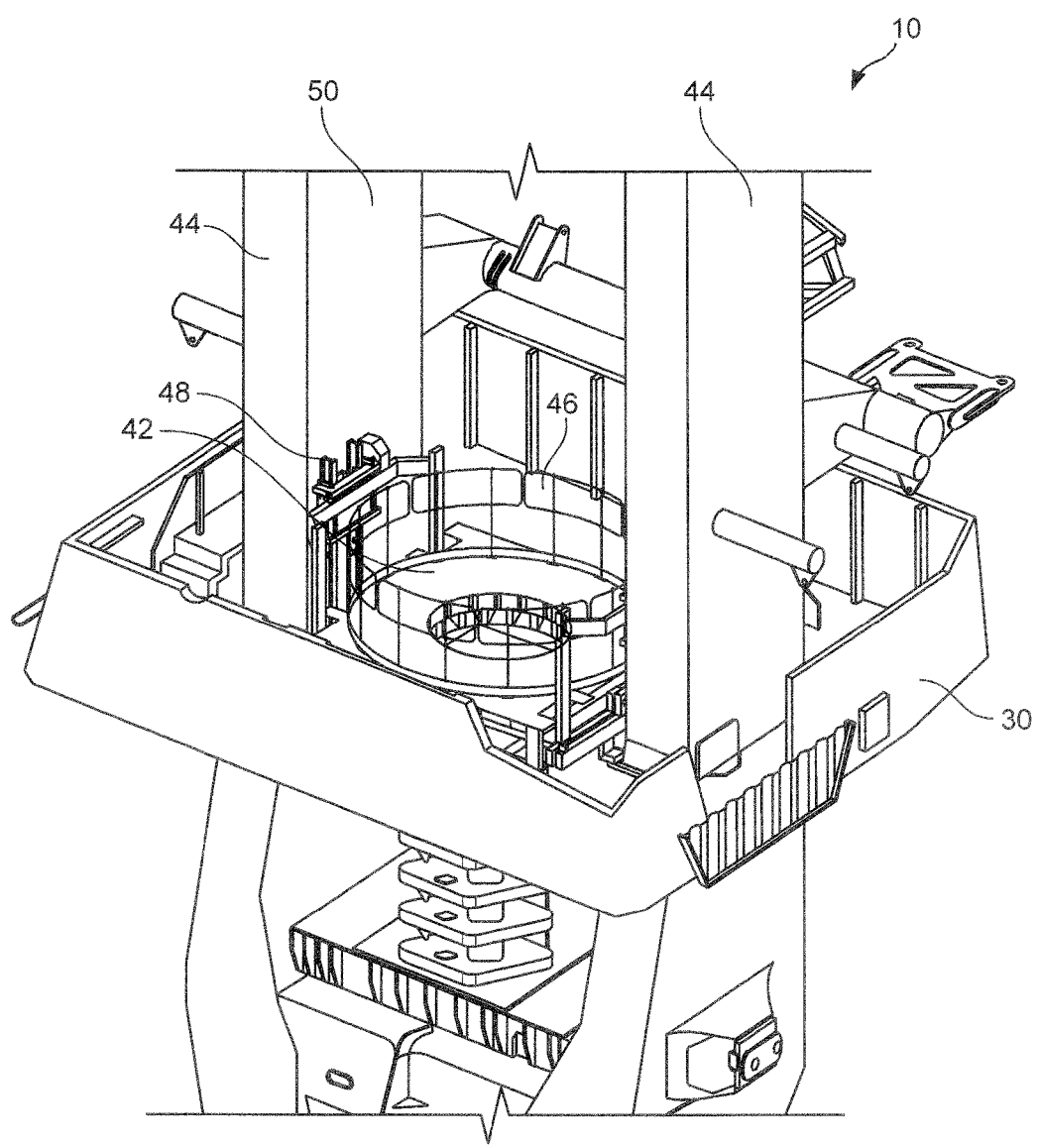
Figure 5:
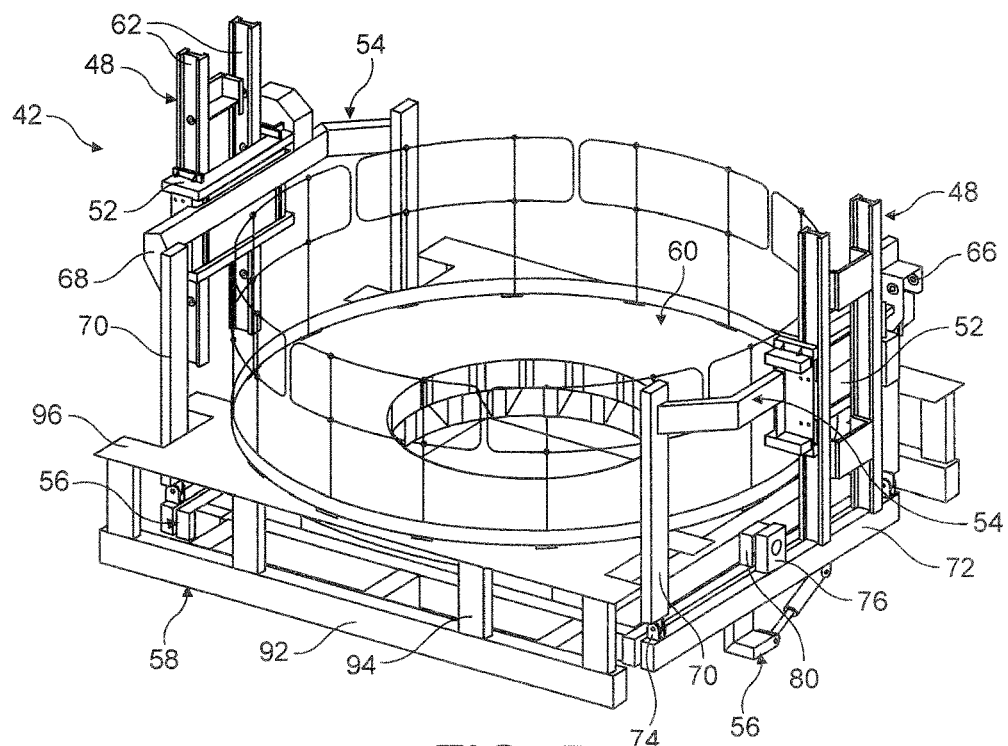
Figure 6:
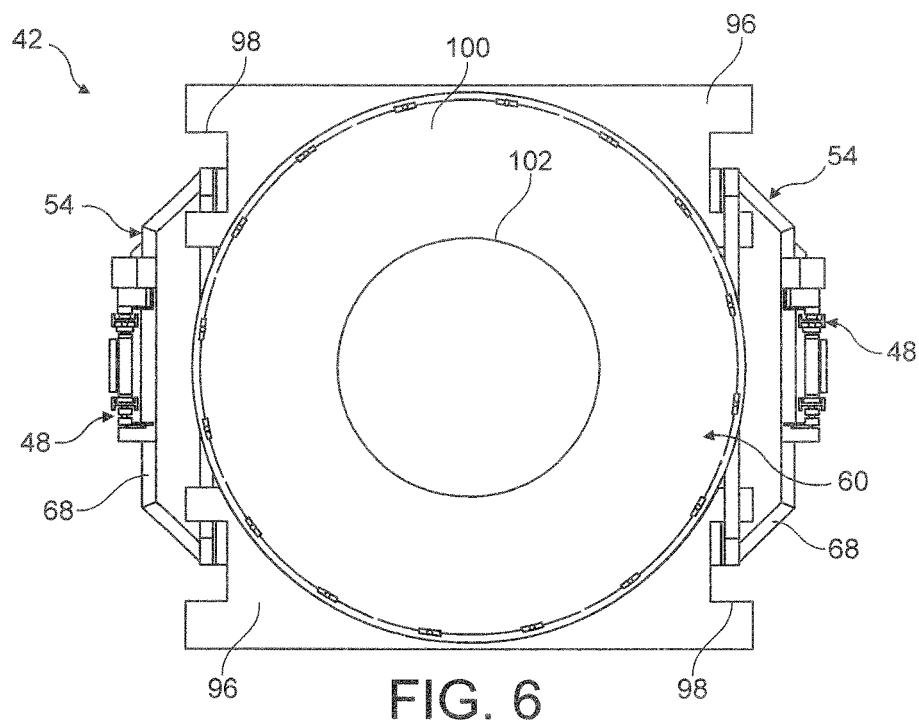
Figure 7:
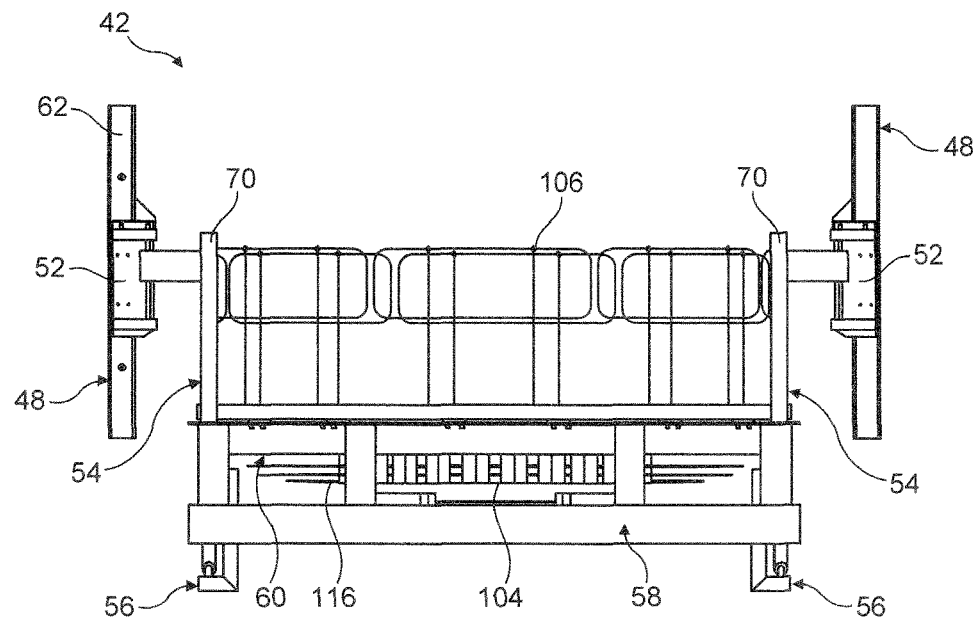
Figure 8:
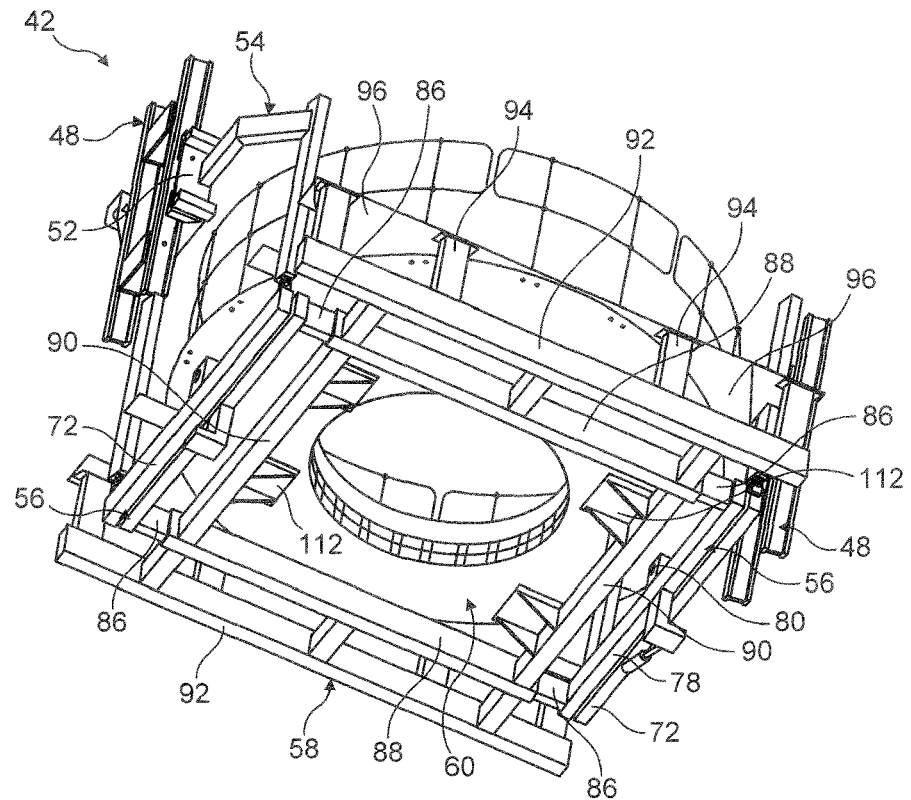
Figure 9:
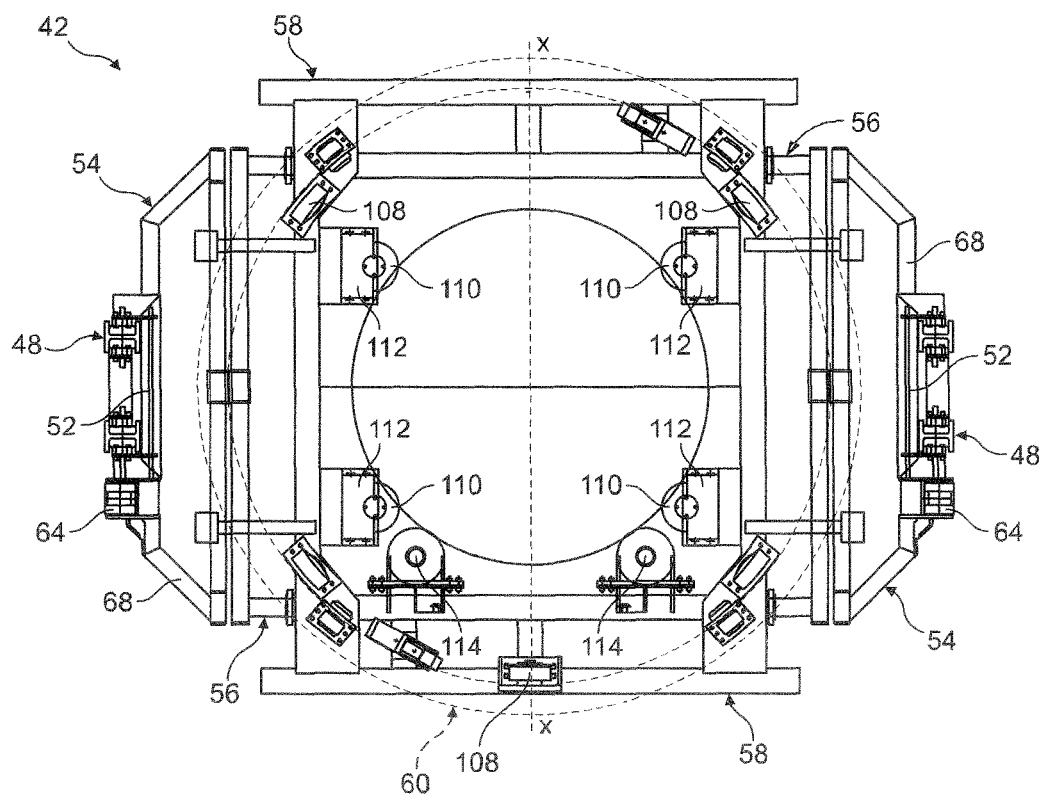
Figure 10:
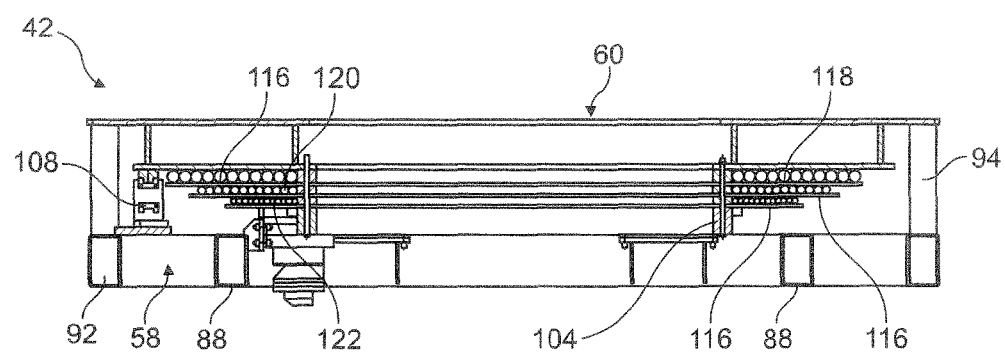
Figure 11:
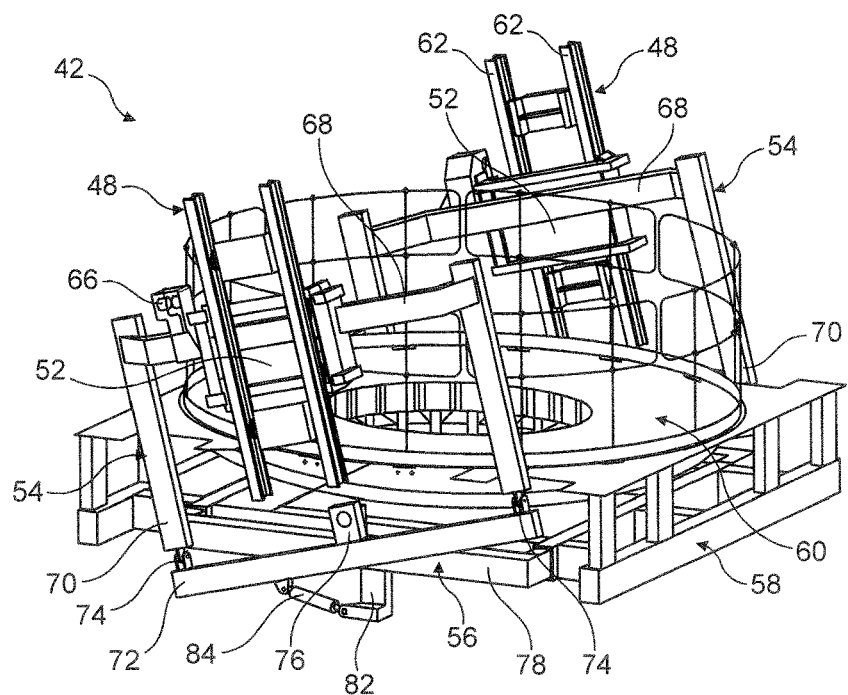
Figure 12:
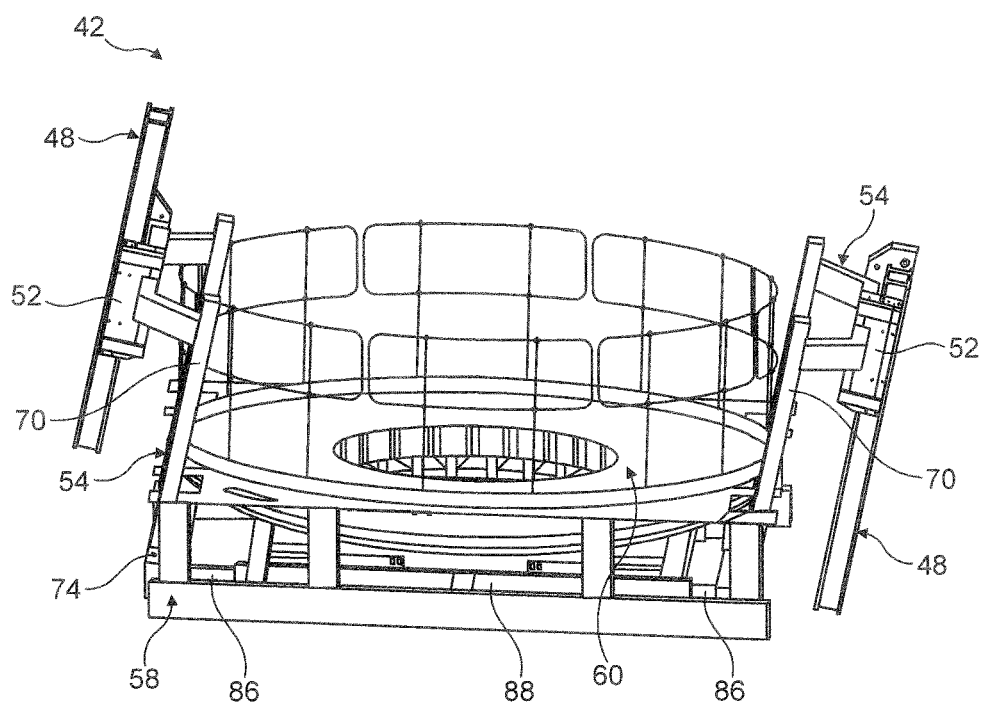

Reference has already been made to FIGS. 1 to 3 of the accompanying drawings to put the invention into context. In order that the invention may be more readily understood, reference will now be made, by way of example, to the remaining drawings in which:

FIG. 4 is a perspective view of a turntable assembly in accordance with the present invention, mounted to a J-lay tower of a pipelaying vessel;

FIG. 5 is a perspective view of the turntable assembly of FIG. 4, viewed from above, with upright tracks associated with the J-lay tower in a vertical position;

FIG. 6 is a plan view of the assembly shown in FIG. 5;

FIG. 7 is a side view of the assembly shown in FIGS. 5 and 6;

FIG. 8 is a perspective view from below of the assembly shown in FIGS. 5 to 7;

FIG. 9 is a sectional view of the assembly shown in FIGS. 5 to 8, viewed from above;

FIG. 10 is a sectional view of the assembly shown in FIGS. 5 to 9, taken on line X-X of FIG. 9;

FIG. 11 is a perspective view of the assembly of FIGS. 5 to 10 from above, showing the upright tracks tilted with respect to the vertical about a first horizontal axis; and FIG. 12 is a perspective view of the assembly of FIGS. 5 to 10 from above, showing the upright tracks tilted with respect to the vertical about a second horizontal axis orthogonal to the first horizontal axis.

Referring firstly to FIG. 4 of the drawings, a turntable assembly 42 in accordance with the present invention is shown mounted to a gimballed J-lay tower 10 of a pipelaying vessel. The J-lay tower 10 comprises spaced-apart generally-parallel pillars 44, fabricated of hollow steel box sections having a generally oblong cross-section and locally flat walls. The turntable assembly 42 is disposed in the gap between the pillars 44, at the first work station 30 of the J-lay tower 10 where a floor 46 bridges the pillars 44.

The turntable assembly 42 is mounted to a pair of upright tracks 48 (only one is visible in FIG. 4) that lie opposed to each other about the assembly, in substantially parallel planes. The tracks 48 are fixed to the structure of the J-lay tower 10, being attached to opposed inner walls 50 of the pillars 44 at the first work station 30.

In practice, means will be provided for fine adjustment and levelling of the tracks 48 with respect to the pillars 44 of the J-lay tower 10. However, for all practical purposes, the tracks 48 may be assumed to be in fixed relation to the J-lay tower 10 to tilt with it—in this example by up to 15° from the vertical in any direction.

FIGS. 5 to 12 show the turntable assembly 42 in detail. In FIGS. 5 to 8, the upright tracks 48 are vertical whereas in FIGS. 11 and 12, the tracks 48 are tilted with respect to the vertical as the J-lay tower 10 pivots about mutually orthogonal, substantially horizontal axes when gimballing in use. More specifically, FIG. 11 shows the tracks 48 tilting about a pivot axis that extends orthogonally with respect to the planes of the tracks 48. Conversely, FIG. 12 shows the tracks 48 tilting about a pivot axis that extends parallel to the planes of the tracks 48.

In overview, the turntable assembly 42 comprises:
 a pair of carriages 52, each carriage 52 being movable up and down along a respective one of the tracks 48;
 a pair of suspension frames 54, each suspension frame 54 being fixed to and supported by a respective one of the carriages 52;
 a pair of lateral supports 56, each lateral support 56 being coupled to a respective one of the suspension frames 54 by an arrangement of hinges defining mutually orthogonal, generally horizontal pivot axes;
 a base frame 58 floatingly supported by the lateral supports 56 such that lateral movement of the lateral supports 56 with respect to the base frame 58 accommodates differential movement of the carriages 52 along their tracks 48 as the J-lay tower 10 tilts about one of its pivot axes; and
 an annular turntable 60 supported atop the base frame 58 to turn about the pipe string in use, while remaining level together with the base frame 58 as the J-lay tower 10 gimbals about both of its pivot axes.

The abovementioned parts of the turntable assembly 42 will now be described in more detail.

Each upright track 48 comprises a parallel pair of H-section members 62 bridged at intervals by cross-pieces, at which the tracks 48 are attached to the pillars 44 of the J-lay tower 10. The associated carriage 52 is generally C-shaped in plan, to wrap around and embrace the outer inboard flanges of the H-section members 62.

A drive mechanism, in this case comprising a hydraulic cylinder 64, drives the carriage 52 up and down along the track 48. As best shown in the plan sectional view of FIG. 9, the hydraulic cylinder 64 lies beside the track 48 and acts parallel to it, between opposed clevis mountings 66 situated respectively on the carriage 52 and on the pillar 44 of the J-lay tower 10. The clevis mounting 66 of a carriage 52 may be seen in FIGS. 5 and 11. Spherical joints (not shown) at the various clevis mountings 66 accommodate any slight misalignment that may arise during installation or that may develop in use of the turntable assembly 42.

The carriages 52 are movable independently of each other by controlling relative pressure in their respective hydraulic cylinders 64. Most usually, the desired orientation of the J-lay tower 10 with respect to the pipelaying vessel will be predetermined according to the conditions applying to a particular pipelaying run. In that case, relative pressure in the hydraulic cylinders 64 is adjusted under manual control as may be necessary to level the turntable 60, taking into account the orientation of the J-lay tower 10. The orientation of the J-lay tower 10, and hence the pressure settings in the hydraulic cylinders 64, will not then be altered unless changing conditions during the pipelaying run may necessitate that.

Where active gimballing of the J-lay tower 10 is enabled, relative pressure in the hydraulic cylinders 64 may be adjusted automatically and dynamically in response to signals from the control system that drives gimballing movement of the J-lay tower 10. In this way, the control system can compensate for such movement by driving the carriages 52 to different elevations as necessary to keep the turntable 60 substantially level.

When the J-lay tower 10 is vertical as shown in FIGS. 5 to 8, the carriages 52 adopt the same elevation with respect to their respective tracks 48. Their common elevation may be maintained when the J-lay tower 10 is tilted in the manner shown in FIG. 11, i.e. about a horizontal pivot axis that extends orthogonally with respect to the planes of the tracks 48. However, when the J-lay tower 10 is tilted in the manner shown in FIG. 12, i.e. about a horizontal pivot axis that extends parallel to the planes of the tracks 48, differential movement and elevation of the carriages 52 is necessary to keep the base frame 58 and hence the turntable 60 level.

Thus, as the J-lay tower 10 tilts to the right in the manner shown in FIG. 12, the carriage 52 on the right is driven upwardly with respect to its associated track 48 to keep the turntable 60 level. A similar levelling effect may be obtained by driving the carriage 52 on the left downwardly with respect to its associated track 48. Relative movement between the carriages 52 is the key to tilt compensation in this instance, not merely relative movement between the carriages 52 and their associated tracks 48.

It will be explained more fully later how the carriages 52 may be moved where necessary to adjust the height of the turntable 60—and hence the welding elevation—with respect to a pipe string supported by the J-lay tower 10.

Each suspension frame 54 comprises an upper cross-member 68 fixed to the carriage 52, the upper cross-member 68 having end sections angled inboard with respect to the turntable assembly 42. A pair of legs 70 are rigidly attached at their upper ends to the upper cross-member 68, the legs 70 extending downwardly in parallel from respective ends of the upper cross-member 68. By virtue of the angled end sections of the upper cross-member 68, the legs 70 lie in a common plane that is inboard of the associated carriage 52, parallel to the associated upright track 48.

A lower cross-member 72 is hinged to, and bridges the gap between, the lower ends of the legs 70 of each suspension frame 54. The hinges 74 between the lower cross-member 72 and the legs 70 of the suspension frame 54 define a first pivot axis that extends between the lower ends of the legs 70, parallel to the planes of the tracks 48.

The first pivot axis allows pivotal movement of the suspension frame 54 with respect to the lateral support 56 to accommodate differential elevation of the carriages 52, as best shown in FIG. 12. Again, these hinges 74 may include spherical joints to accommodate any misalignment or geometrical clashes.

A pivot projection 76 extends upwardly from the lateral mid-point of the lower cross-member 72. The lower cross-member 72 is pivotably attached here to the associated lateral support 56 to define a second pivot axis orthogonal to the first pivot axis. Thus, it will be apparent that the lower cross-member 72 defines both of the mutually orthogonal pivot axes on which gimballing movement of the turntable assembly 42 relies.

More specifically, each lateral support 56 comprises a beam 78 that lies inboard of, and in a plane parallel to, the lower cross-member 72 of the associated suspension frame 54. The beam 78 has a pivot projection 80 extending upwardly from its lateral mid-point, aligned with the corresponding pivot projection 76 of the lower cross-member 72. A pivot pin (not shown) extends through aligned holes in the pivot projections 76, 80 to define a pivot coupling between the suspension frame 54 and the associated lateral support 56. That pivot coupling is on the second pivot axis.

A crank 82 depends from the lateral mid-point of the beam 78 of the lateral support 56 to define an anchorage for a hydraulic cylinder 84. The hydraulic cylinder 84 is pivotally attached by clevis mountings at its respective ends to the crank 82 of the beam 78 of the lateral support 56 and to the underside of the lower cross-member 70 of the suspension frame 54. A corresponding hydraulic cylinder 84 is provided in similar manner between the other suspension frame 54 and the other lateral support 56 on the other side of the turntable assembly 42, where a corresponding pivot arrangement is also aligned on the second axis.

The hydraulic cylinders 84 between the suspension frames 54 and the lateral supports 56 act together under equal hydraulic pressure to drive pivotal movement of the lateral supports 56 about the second axis, to whatever extent may be necessary to keep the base frame 58 and hence the turntable 60 level as the J-lay tower 10 tilts in use. Again, control of these hydraulic cylinders 84 will usually involve manual adjustment of hydraulic pressure at the beginning of a pipelaying run, and the setting will not thereafter change unless it is necessary to re-orient the J-lay tower 10. However, an active gimballing application would involve adjusting hydraulic pressure in response to signals from the control system that drives gimballing movement of the J-lay tower 10.

The different pivotal movements about the first and second axes have been illustrated and described separately for clarity. However, it will be apparent that pivotal movements will often take place simultaneously about both the first and second axes to match the gimballing movement of the J-lay tower 10.

As best shown in the underside view of FIG. 8, each lateral support 56 is generally C-shaped in plan, with arms 86 that extend inboard from each end of the beam 78, orthogonally with respect to the beam 78. The arms 86 engage telescopically within parallel open-ended tubular members 88 of the base frame 58 so that the lateral supports 56 may slide in and out with respect to the base frame 58. This in-and-out movement allows the base frame 58 to remain generally horizontal by accommodating variations in spacing between the carriages 52 where tilting of the upright tracks 48 is compensated by differential movement of the carriages 52. Referring here to FIG. 12, the reader may compare where the arms 86 of the lateral support 56 on the left are extended from the tubular members 88 of the base frame 58 whereas the arms 86 of the lateral support 56 on the right are retracted into the other ends of those tubular members 88.

The base frame 58 is generally square in plan. FIG. 8 shows that the base frame 58 comprises cross-members 90 that link the tubular members 88 and extend outwardly to support outriggers 92 that lie parallel to and outboard of the tubular members. Pillars 94 extend upwardly from the outriggers to support fixed protective corner panels 96 disposed around the turntable 60. These corner panels have cut-outs 98 aligned with the legs 70 of the suspension frames 54 to accommodate pivoting movement of the legs 70.

The turntable 60 comprises an annular platform 100 defining a central opening 102 to receive a pipe string and its support bushing during a welding operation akin to that shown in FIG. 3. A tubular core 104 extends downwardly like a skirt from the platform 100 around the central opening 102. A handrail 106 extends upwardly around the outer periphery of the platform 102.

Two sets of wheels act as bearings to locate the turntable 60 with respect to the base frame 58. The various wheels are best appreciated in the sectional view of FIG. 9.

A first wheel set comprises three wheels 108 supported by extensions of the base frame 58 and spaced equi-angularly around the turntable 60, 120° apart. The wheels 108 of the first set bear the weight of the turntable 60 by running under the underside of the turntable platform 100 near its outer edge. Their triangular spacing minimises the consequences of any minor difference in level between the wheels 108.

One of the wheels 108 of the first set can be seen in the sectional view of FIG. 10. It will be noted that these wheels 108 turn about axes inclined slightly with respect to the horizontal so that the top of each wheel 108 tilts slightly outwardly. This tilt aids centring of the turntable 60 with respect to the base frame 58.

A second wheel set comprises four wheels 110 supported by respective flanges 112 extending inwardly from the cross-members 92 of the base frame 58. Those wheels 110 run on vertical axes around the outside of the core 106 to keep the turntable 60 centred with respect to the base frame 58.

An electrically- or hydraulically-powered rack-and-pinion mechanism drives rotation of the turntable 60 around the pipe string in use. As FIG. 9 shows, a pair of drive units 114 are disposed to one side of the core 106: each turns a pinion wheel that engages a rack extending circumferentially around the core 106

Services are supplied to welding bugs running on guide tracks around the welded joint as in previous arrangements. In this instance, three of those services—namely power, data connections for instrumentation, and shielding gas—are provided by flexible spiral umbilicals and cables that encircle the tubular core 106.

Specifically, three annular partitions 116 radiate horizontally from the core, parallel to and spaced from each other and from the underside of the turntable platform 100. As FIG. 10 shows, the partitions 116 define between them deep slots that extend circumferentially around the core 106 in a horizontal plane to accommodate the necessary umbilicals and cables in respective flat spirals stacked one atop another. From the top, these are power cables 118, cables 120 carrying instrumentation data, and hoses 122 carrying shielding gas. They may be fed from their slots to above the turntable platform 100 through suitably-positioned cut-outs or hatches in that platform.

The spiral connections 118, 120, 122 unwind tangentially from their slots under externally-applied tension from a suitable tensioner (not shown) as the turntable 60 turns in one direction during a welding operation. Those connections 118, 120, 122 are wound back up into their slots as the turntable 60 turns back in the opposite direction after welding. In this case, rotation of the turntable 60 and hence unwinding must be limited to a certain number of turns before rewinding. This limit may be monitored by a turn counter display visible to operators working on the turntable platform 100, and may be enforced by limit switches (not shown) that detect when the last, innermost windings of the connections 118, 120, 122 start to lift away from the core 106.

The facility for driving the carriages 52 up and down along the tracks 48 may also be used to vary the height of the turntable 60 with respect to the tracks 48 and thus with respect to a pipe string held by the J-lay tower 10. The ability to change welding elevation is of particular benefit when welding pipe-in-pipe joints, where the inner flowline and the outer carrier pipe must be welded at different elevations. It will be apparent that adjusting the height of the turntable 60 may be performed independently of tilt compensation if appropriate.

Although omitted from the drawings for brevity, infill panels will generally be provided on the turntable platform. These are half shells that locate in the centre of the platform to close the gap between the floor and the pipe string.

Many variations are possible within the inventive concept. For example, the turntable assembly of the present invention could, in principle, be used for other applications relating to pipelaying, such as weld inspection or the application of a field coating after welding.

It is emphasised that whilst Acergy Polaris launches the pipe string over the side of the vessel, other locations are also possible—such as at the stern or the bow, or through a moon pool in the hull of a vessel.

The invention claimed is:

1. A turntable assembly for supporting personnel performing welding, inspection, coating and clamping operations on a pipe string in a pivotably-mounted J-lay tower of a pipelaying vessel, the assembly comprising:
   an annular turntable supporting personnel within the J-lay tower and having an annular platform defining a central opening to receive the pipe string;
   a base frame that supports the annular turntable to turn around the pipe string; and
   a tilt-compensating mechanism for attachment to the tower, acting on the base frame to tilt the turntable relative to the tower to level the turntable as the tower pivots;
   wherein the tilt-compensating mechanism comprises at least one carriage that movably attaches the tilt-compensating mechanism to the tower and that is driveable up and down with respect to the tower, the at least one carriage being movable along a track that is fixed to the tower and that pivots with the tower; and
   wherein the base frame is pivotably connected to the at least one carriage by a member that is hinged with respect to the carriage about one pivot axis and that carries a pivot defining a second pivot axis so that the base frame is pivotable with respect to the at least one carriage about two mutually-orthogonal, generally horizontal pivot axes.

2. The turntable assembly of claim 1, wherein the at least one carriage is driven in response to manual control or to signals from a control system that controls pivoting movement of the tower.

3. The turntable assembly of claim 1, wherein the base frame is supported with respect to the tower entirely by one or more of the at least one carriage.

4. The turntable assembly of claim 1 wherein the at least one carriage comprises at least two carriages, wherein the turntable is levelled at least partially by differential elevation of the at least two carriages.

5. The turntable assembly of claim 1, wherein the base frame pivots about one pivot axis in response to up-or-down movement of the at least one carriage and about the other pivot axis in response to an actuator acting between the base frame and the carriage.

6. The turntable assembly of claim 5, wherein the actuator acts either in response to manual control or in response to signals from a control system that controls pivoting movement of the tower.

7. The turntable assembly of claim 1, wherein the member is supported by a suspension frame that is fixed to the carriage.

8. The turntable assembly of claim 1, further comprising a beam that is pivotably attached to the member at the pivot and that supports the base frame.

9. The turntable assembly of claim 1 comprising a floating joint between the base frame and the at least one carriage, the floating joint comprising at least one lateral support element that is laterally extensible and retractable with respect to the base frame.

10. The turntable assembly of claim 9, wherein the lateral support element of the floating joint is received telescopically in a tubular member of the base frame.

11. The turntable assembly of claim 8, comprising a floating joint between the base frame and the at least one carriage, the floating joint comprising at least one lateral support element that is laterally extensible and retractable with respect to the base frame, wherein the beam carries the lateral support element of the floating joint.

12. The turntable assembly of claim 1, wherein turntable elevation is adjustable separately from tilt compensation by up-or-down movement of the at least one carriage.

13. The turntable assembly of claim 1, wherein the turntable comprises a core about which cables or umbilicals are wound to provide services to welding apparatus acting on the pipe string.

14. A vessel having a pivotably-mounted J-lay tower, or a J-lay tower for such a vessel, comprising a turntable assembly for supporting personnel performing welding, inspection, coating and clamping operations on a pipe string in the J-lay tower, the assembly comprising:
   an annular turntable supporting personnel within the J-lay tower and having an annular platform defining a central opening to receive the pipe string;
   a base frame that supports the annular turntable to turn around the pipe string; and
   a tilt-compensating mechanism for attachment to the tower, acting on the base frame to tilt the turntable relative to the tower to level the turntable as the tower pivots;
   wherein the tilt-compensating mechanism comprises at least one carriage that movably attaches the tilt-compensating mechanism to the tower and that is driveable up and down with respect to the tower along an upright track that is fixed to the tower and that pivots with the tower; and
   wherein the base frame is pivotably connected to the at least one carriage.

15. A method of levelling an annular turntable that supports personnel and turns around a pipe string when performing welding, inspection, coating, and clamping operations in a pivotably-mounted J-lay tower, the turntable supporting personnel being within the J-lay tower and having an annular platform defining a central opening to receive the pipe string, the method comprising supporting the turntable by one or more carriages that movably attach a tilt-compensating mechanism to the tower and driving the or each carriage up or down with respect to the tower along a track that is fixed to the tower and that pivots with the tower to tilt the turntable relative to the tower to provide compensation for the tilt of the tower.

16. A method of pipe-in-pipe welding involving the use of a turntable in a pivotably-mounted J-lay tower, the method comprising supporting the turntable by one or more supports and, when welding a joint to a pipeline end, driving the or each support up or down with respect to the tower to different weld elevations as required by the pipe-in-pipe arrangement and levelling the turntable according to the method of claim 15.

* * * * *